(12) United States Patent
Bartlett et al.

(10) Patent No.: US 11,215,384 B2
(45) Date of Patent: Jan. 4, 2022

(54) SYSTEM AND METHOD FOR CRYOGENIC COOLING

(71) Applicant: Edwards Vacuum LLC, Sanborn, NY (US)

(72) Inventors: Allen J. Bartlett, New London, NH (US); William Johnson, Andover, MA (US); Mark Collins, Plymouth, MA (US); Sergei Syssoev, Townsend, MA (US); James A. O'Neil, Bedford, MA (US); Michael J. Eacobacci, Dennisport, MA (US)

(73) Assignee: Edwards Vacuum LLC, Sanborn, NY (US)

( * ) Notice: Subject to any disclaimer, the term of this patent is extended or adjusted under 35 U.S.C. 154(b) by 0 days.

(21) Appl. No.: 16/221,954

(22) Filed: Dec. 17, 2018

(65) Prior Publication Data

US 2019/0120528 A1    Apr. 25, 2019

Related U.S. Application Data

(62) Division of application No. 13/106,180, filed on May 12, 2011, now Pat. No. 10,156,386.
(Continued)

(51) Int. Cl.
*F25B 7/00* (2006.01)
*F25B 9/02* (2006.01)
(Continued)

(52) U.S. Cl.
CPC ............... *F25B 7/00* (2013.01); *F25B 9/002* (2013.01); *F25B 9/02* (2013.01); *F25B 9/14* (2013.01);
(Continued)

(58) Field of Classification Search
CPC ...... F25B 9/14; F25B 7/00; F25B 9/02; F25B 9/002; F25B 2400/06; F25B 2600/0253;
(Continued)

(56) References Cited

U.S. PATENT DOCUMENTS

| 3,733,845 A | * | 5/1973 | Lieberman | ............... F25B 7/00 62/335 |
| 4,277,949 A | | 7/1981 | Longsworth | |

(Continued)

FOREIGN PATENT DOCUMENTS

| EP | 1498670 A2 | 1/2005 |
| EP | 1672300 A1 | 6/2006 |

(Continued)

OTHER PUBLICATIONS

International Preliminary Report on Patentability from PCT/US2011/036213 dated Nov. 22, 2012.
(Continued)

*Primary Examiner* — Frantz F Jules
*Assistant Examiner* — Martha Tadesse
(74) *Attorney, Agent, or Firm* — Theodore M. Magee; Westman, Champlin & Koehler, P.A.

(57) ABSTRACT

A heat exchanger within an insulated enclosure receives primary refrigerant at a high pressure and cools the primary refrigerant using a secondary refrigerant from a secondary refrigeration system. An expansion unit within the insulated enclosure receives the primary refrigerant at the high pressure from the heat exchanger and discharges the primary refrigerant at a low pressure. A supply line delivers the primary refrigerant at the low pressure to the load and a return line returns the primary refrigerant from the load to the primary refrigeration system. A system control unit controls operation of at least one of the primary refrigeration system and the secondary refrigeration system to provide a
(Continued)

variable refrigeration capacity to the load based on at least one of: a pressure of the primary refrigerant delivered to the load, and at least one temperature of the load.

18 Claims, 5 Drawing Sheets

Related U.S. Application Data (60) Provisional application No. 61/363,514, filed on Jul. 12, 2010, provisional application No. 61/333,801, filed on May 12, 2010.

(51) Int. Cl.
  *F25B 9/14* (2006.01)
  *F25B 9/00* (2006.01)
(52) U.S. Cl.
  CPC .......... *F25B 9/006* (2013.01); *F25B 2400/01* (2013.01); *F25B 2400/06* (2013.01); *F25B 2600/0251* (2013.01); *F25B 2600/0253* (2013.01); *F25B 2700/21* (2013.01); *Y02B 30/70* (2013.01); *Y10T 279/34* (2015.01)
(58) Field of Classification Search
  CPC .. F25B 2700/21; F25B 9/006; F25B 2400/01; F25B 25/005; Y02B 30/741; Y10T 279/34
  See application file for complete search history.

(56) References Cited

U.S. PATENT DOCUMENTS

| | | | |
|---|---|---|---|
| 4,279,127 A | 7/1981 | Longsworth | |
| 4,796,433 A | 1/1989 | Bartlett | |
| 4,829,785 A * | 5/1989 | Hersey | H01M 8/0656 62/467 |
| 4,840,043 A | 6/1989 | Sakitani | |
| 4,854,131 A | 8/1989 | Sakitani | |
| 4,951,471 A | 8/1990 | Sakitani | |
| 5,060,481 A | 10/1991 | Bartlett et al. | |
| RE33,878 E | 4/1992 | Bartlett et al. | |
| 5,508,613 A | 4/1996 | Kotsubo et al. | |
| 5,694,776 A | 12/1997 | Sahm | |
| 5,889,456 A | 3/1999 | Triebe et al. | |
| 6,324,856 B1 | 11/2001 | Weng | |
| 6,415,613 B1 * | 7/2002 | Ackermann | F25B 9/00 62/51.1 |
| 6,425,250 B1 | 7/2002 | Acharya et al. | |
| 6,609,383 B1 * | 8/2003 | Kusada | F25B 9/10 62/51.2 |
| 6,679,066 B1 * | 1/2004 | Funayama | F17C 3/08 62/50.2 |
| 7,003,977 B2 | 2/2006 | Steinbach et al. | |
| 7,111,467 B2 * | 9/2006 | Apparao, V | F25B 7/00 62/79 |
| 7,126,335 B2 | 10/2006 | Morita et al. | |
| 7,222,490 B2 | 5/2007 | Triebe et al. | |
| 7,430,871 B2 * | 10/2008 | Strobel | F25B 9/02 250/286 |
| 7,528,392 B2 | 5/2009 | England et al. | |
| 7,900,373 B2 | 3/2011 | Reitinger | |
| 8,532,832 B2 | 9/2013 | Cowans et al. | |
| 10,156,386 B2 | 12/2018 | Bartlett et al. | |
| 2003/0115894 A1 | 6/2003 | Podtchereniaev et al. | |
| 2004/0129015 A1 * | 7/2004 | Apparao | F25B 7/00 62/335 |
| 2005/0086974 A1 * | 4/2005 | Steinbach | F25B 25/005 62/437 |
| 2005/0227503 A1 | 10/2005 | Reitinger | |
| 2005/0229609 A1 * | 10/2005 | Kirichek | F25B 9/02 62/6 |
| 2006/0038567 A1 * | 2/2006 | Morita | G01R 33/31 324/318 |
| 2006/0097146 A1 * | 5/2006 | Strobel | F25B 9/02 250/286 |
| 2006/0130519 A1 * | 6/2006 | Little | F25J 1/0055 62/612 |
| 2006/0168976 A1 * | 8/2006 | Flynn | F25B 47/006 62/196.4 |
| 2007/0107448 A1 | 5/2007 | Dresens et al. | |
| 2008/0236179 A1 | 10/2008 | Ignatiev et al. | |
| 2010/0139297 A1 | 6/2010 | McCormick et al. | |
| 2012/0038120 A1 | 2/2012 | Bartlett et al. | |
| 2013/0067952 A1 * | 3/2013 | RI | H01F 6/04 62/513 |

FOREIGN PATENT DOCUMENTS

| | | | |
|---|---|---|---|
| EP | 2019271 A1 | 1/2009 | |
| JP | 63075760 | 10/1989 | |
| JP | 63220048 A | 3/1990 | |
| JP | 2002203163 | 8/1990 | |
| JP | 2004020754 | 1/1992 | |
| JP | 2005340622 | 12/1993 | |
| JP | 06185820 A * | 7/1994 | |
| JP | 2011125474 | 5/1995 | |
| JP | 2008222429 | 8/1996 | |
| JP | 09229503 A * | 9/1997 | |
| JP | 2009303897 | 11/1997 | |
| JP | 3102652 | 10/2000 | |
| JP | 2001133062 A * | 5/2001 | |
| JP | 3573384 B2 | 10/2004 | |
| JP | 2006125772 A * | 5/2006 | |
| JP | 2007017010 | 1/2007 | |
| WO | 2006027330 | 3/2006 | |
| WO | 2008133965 A1 | 11/2008 | |

OTHER PUBLICATIONS

International Search Report and Written Opinion of PCT/US2011/036213 dated Sep. 26, 2011.

* cited by examiner

SYSTEM AND METHOD FOR CRYOGENIC COOLING

RELATED APPLICATIONS

This application is a divisional of U.S. application Ser. No. 13/106,180, filed May 12, 2011, which claims the benefit of U.S. Provisional Application No. 61/363,514, filed on Jul. 12, 2010; and claims the benefit of U.S. Provisional Application No. 61/333,801, filed on May 12, 2010. The entire teachings of the above applications are incorporated herein by reference.

BACKGROUND

With continued miniaturization of semiconductor devices, there has been an increased demand for ultra-shallow junctions. For example, tremendous effort has been devoted to creating better activated, shallower and more abrupt source-drain extension junctions to meet the needs of modern semiconductor devices. It has been discovered that very low wafer temperature during ion implantation is advantageous for minimizing damage of a silicon wafer. In addition, there is an ongoing need for very low temperature cooling in a wide variety of other semiconductor processes and other fields.

SUMMARY

In accordance with an embodiment of the invention, there is provided a system for cooling a load. The system comprises a closed loop primary refrigeration system comprising: a primary compressor taking in a primary refrigerant at a low pressure and discharging the primary refrigerant at a high pressure; an insulated enclosure comprising an inlet receiving the primary refrigerant at the high pressure from the primary compressor and an outlet returning the primary refrigerant at the low pressure to the primary compressor; at least one heat exchanger within the insulated enclosure receiving the primary refrigerant at the high pressure and cooling the primary refrigerant using a secondary refrigerant from a secondary refrigeration system, the secondary refrigeration system being in heat exchange relationship with the primary refrigerant in the at least one heat exchanger; an expansion unit within the insulated enclosure receiving the primary refrigerant at the high pressure from the at least one heat exchanger and discharging the primary refrigerant at the low pressure; and a supply line delivering the primary refrigerant at the low pressure to the load and a return line returning the primary refrigerant from the load to the primary refrigeration system. The system further comprises the secondary refrigeration system, which comprises at least one secondary cryogenic refrigerator. A system control unit controls operation of at least one of the primary refrigeration system and the secondary refrigeration system to provide a variable refrigeration capacity to the load based on at least one of: a pressure of the primary refrigerant delivered to the load, and at least one temperature of the load.

In further, related embodiments, the at least one temperature of the load may comprise a temperature of from about −80 C to about −250 C. The secondary refrigeration system may comprise a first channel delivering cooling to at least one heat transfer surface of the load and a second channel delivering the secondary refrigerant to the at least one heat exchanger. The at least one heat transfer surface may transfer heat to cool at least a portion of the load to a temperature in the range of from about −40 C to about −100 C. The at least one heat transfer surface may comprise at least a portion of a chamber to receive a semiconductor substrate to be processed by a system of the load. The secondary refrigeration system may comprise a mixed gas refrigeration system. The mixed gas refrigeration system may comprise more than one heat exchanger and at least one phase separator. The secondary refrigeration system may comprise a reverse Brayton refrigeration system. The load may comprise at least one of a pre-cool cryogenic interface module, a pre-cool chamber, a cold pad cryogenic interface module, a platen, an electrostatic chuck and two separate loads.

In other related embodiments, the system may further comprise an electrical interface control unit in electronic communication with the load. The electrical interface control unit may receive an electronic signal indicating at least one temperature of the load; and/or an electronic signal indicating at least one set-point temperature of the load. The electrical interface control unit may output an electrical signal to control operation of the secondary refrigeration system to control at least one temperature of the load. The at least one temperature of the load controlled by the electrical interface control unit may comprise a temperature of at least one heat transfer surface of the load.

In further related embodiments, the system control unit may comprise a control unit to control the providing of the variable refrigeration capacity to the load based on at least the pressure of the primary refrigerant delivered to the load; a control unit to control a discharge rate of the primary compressor; a control unit to control at least one of a high pressure, a low pressure and a pressure differential of the primary compressor; a control unit to control a heat source to supply heat to be delivered to the primary refrigerant; a control unit to control operation of an adjustable throttle; a control unit to control flow of the primary refrigerant to bypass at least a portion of the at least one heat exchanger; a control unit to control flow of the primary refrigerant to bypass at least a portion of the primary refrigeration system; a control unit to control a rate of flow of the primary refrigerant; a control unit to control a rate of flow of the secondary refrigerant; a control unit to control a set point temperature of the secondary refrigeration system; a control unit to control a heat source to supply heat to be delivered to the secondary refrigerant; a control unit to control a speed of a secondary compressor of the secondary refrigeration system; a control unit to control flow of the secondary refrigerant to bypass at least a portion of the secondary refrigeration system; a control unit to control flow of at least a portion of the primary refrigerant to warm at least a portion of the load; and/or a control unit to control flow of at least a portion of the secondary refrigerant to warm at least a portion of the load.

In further, related embodiments, the insulated enclosure may be integrated into at least a portion of the secondary refrigeration system. The at least one heat exchanger may comprise a condenser. The system control unit may comprise a control unit to adjust the speed of the at least one secondary cryogenic refrigerator. The system control unit may further comprises a control unit to adjust the speed of at least one secondary compressor of the at least one secondary cryogenic refrigerator. The system control unit may comprise a control unit to turn off at least one of the at least one secondary cryogenic refrigerators. The system control unit may control operation of at least one of the primary refrigeration system and the secondary refrigeration system to vary a proportion of the primary refrigerant that is flowed to the load in a liquid phase versus a gaseous phase. The system may comprise more than one secondary cryogenic refrigerator, and the system control unit may comprise a control unit to control operation of the more than one secondary cryogenic refrigerators to run at different speeds from each other; or to run at the same speed as each other. The system control unit may control operation of at least one of the primary refrigeration system and the secondary refrigeration system to maintain a substantially constant temperature of the at least one temperature of the load. The system control unit may comprise a control unit to route at least a portion of the primary refrigerant to a warmer surface in the system to reduce refrigeration applied to the load. The system control unit may comprise a control unit to permit at least one of variable speed operation of the primary compressor, and pulsed operation of the primary compressor.

In further, related embodiments, the system control unit may control operation of the secondary refrigeration system to avoid undercooling of the load by: determining a calculated boiling point of the primary refrigerant returned from the load based on a measured pressure of the primary refrigerant returned from the load; comparing a measured temperature of the primary refrigerant returned from the load with the calculated boiling point; and, if the measured temperature is more than a predetermined temperature difference above the calculated boiling point, controlling the secondary refrigeration system to increase available refrigeration to the load. In another embodiment, the system control unit may control operation of the secondary refrigeration system to avoid undercooling of the load by: monitoring a temperature of the primary refrigerant returning from the load at a first temperature sensor downstream of the load; controlling a small heater, downstream of the first temperature sensor, to turn on if the temperature at the first temperature sensor has reached a predetermined assumed saturation temperature point; monitoring a temperature of the primary refrigerant at a second temperature sensor, downstream of the small heater; and if the turning on of the small heater raises the temperature of the primary refrigerant, controlling the secondary refrigeration system to increase available refrigeration to the load. In another embodiment, the system control unit may control operation of the secondary refrigeration system to avoid overcooling of the load by: monitoring a temperature of the primary refrigerant returning from the load at a first temperature sensor downstream of the load; controlling a small heater, downstream of the first temperature sensor, to turn on if the temperature at the first temperature sensor has reached a predetermined assumed saturation temperature point; monitoring a temperature of the primary refrigerant at a second temperature sensor, downstream of the small heater; and if the turning on of the small heater raises the temperature of the primary refrigerant, determining the magnitude of the heat provided by the small heater and, based on the magnitude, determining whether to control the secondary refrigeration system to decrease available refrigeration to the load. The system control unit may comprise a control unit to adjust a variable heater on the at least one secondary cryogenic refrigerator. The system control unit may comprise a control unit to control a setpoint temperature of the at least one secondary cryogenic refrigerator. The system control unit may control more than one secondary cryogenic refrigerator to have different setpoint temperatures from each other.

In further, related embodiments, the primary refrigerant may comprise at least one of nitrogen, argon, xenon, krypton, helium or a mixed gas refrigerant. The primary refrigerant may comprise at least one refrigerant component having a boiling temperature that is higher than a boiling temperature of a refrigerant used in the secondary refrigeration system; such as, the primary refrigerant may comprise at least one of argon, nitrogen, xenon and krypton, and the secondary refrigerant may comprise at least one of helium and neon. The primary refrigerant may comprise a refrigerant having a boiling temperature that is lower than a boiling temperature of at least one refrigerant used in the secondary refrigeration system. The primary refrigerant may comprise at least one of argon, nitrogen, xenon, krypton and helium, and the secondary refrigerant may comprise a mixed gas refrigerant. The system may further comprise a recuperative heat exchanger within the insulated enclosure and exchanging heat between the primary refrigerant at the high pressure flowing from the inlet of the insulated enclosure and the primary refrigerant returned from the load, the recuperative heat exchanger discharging the primary refrigerant at the high pressure to a condenser. The system may further comprise a bypass valve permitting bypassing of the recuperative heat exchanger such that the primary refrigerant at the high pressure flowing from the inlet of the insulated enclosure does not exchange heat with the primary refrigerant returned from the load. The system control unit may control operation of the secondary refrigeration system to avoid undercooling of the load by: monitoring a temperature in at least one of an intermediate point in the recuperative heat exchanger and an end point of the recuperative heat exchanger; and if the monitored temperature falls below a predetermined temperature, controlling the secondary refrigeration system to decrease available refrigeration to the load.

In further, related embodiments, the load may comprise an electrostatic chuck, which may be a portion of an ion implantation system to manufacture a semiconductor device. The system may further comprise a pre-cooling chamber to receive the semiconductor device prior to its handling by the electrostatic chuck. The load may comprise at least one of: at least a portion of a system for cooling a semiconductor wafer, at least a portion of an ion implantation system, and at least a portion of a physical vapor deposition system. The at least one secondary cryogenic refrigerator may comprise a Gifford-McMahon cycle refrigerator, which may comprise a helium refrigerator. The at least one secondary cryogenic refrigerator may comprise a pulse tube refrigerator. The at least one secondary cryogenic refrigerator may comprise at least one of a reverse Brayton cycle refrigerator, a Stirling cycle refrigerator and a Joule-Thomson cycle refrigerator; and may comprise a refrigerator using a single refrigerant or a refrigerator using a mixed gas refrigerant. The at least one secondary cryogenic refrigerator may comprise more than one secondary cryogenic refrigerator connected to cool the primary refrigerant in a parallel or series flow of the primary refrigerant in heat exchange relationship with the more than one secondary cryogenic refrigerators.

In further, related embodiments, the primary compressor of the primary refrigeration system may comprise a variable speed compressor. The system may further comprise a cryopumping surface to create a vacuum within the insulated enclosure. The cryopumping surface may comprise a second stage of cooling of the at least one secondary cryogenic refrigerator. The system may further comprise a bypass valve permitting the primary refrigerant to bypass the supply line that delivers the primary refrigerant to the load and the return line that returns the primary refrigerant from the load. The expansion unit may comprise at least one of a capillary tube, a valve with a variable flow area, a spring biased valve, a piston expander and a turbine expander. The system may further comprise a pressure regulator regulating flow of the primary refrigerant between a source of the primary refrigerant and the primary refrigerant at the low pressure taken in by the primary compressor; and a pressure control unit to control the pressure regulator to regulate the flow of the primary refrigerant into the system. The system may further comprise an isolation valve connected to a pressure gauge on the insulated enclosure, the isolation valve preventing flow of the primary refrigerant into the inlet of the insulated enclosure if the pressure gauge on the insulated enclosure detects a pressure above a predetermined maximum safe pressure. The system may further comprise a thermal sensor connected to monitor the temperature of the primary refrigerant returning from the insulated enclosure to the primary compressor; and a safety control unit connected to discontinue operation of the secondary refrigeration system if the temperature of the primary refrigerant returning from the insulated enclosure is less than a predetermined touch hazard minimum temperature. The system may further comprise a purifier removing impurities from gas directed from a supply source of the primary refrigerant, prior to the primary refrigerant entering the system; and/or an oil separator removing oil from the primary refrigerant within the primary compressor. At least a portion of each of the supply line and the return line may extend within a vacuum insulated transfer line. The at least one heat exchanger may convert at least a substantial portion of the primary refrigerant to a liquid phase; or the at least one heat exchanger may substantially not convert the primary refrigerant to a liquid phase. The expansion unit may convert at least a substantial portion of the primary refrigerant to a liquid phase.

In further, related embodiments, the supply line may deliver the refrigerant at the low pressure to the load through a transfer line out of the insulated enclosure, and the return line may return the refrigerant from the load to the insulated enclosure through the transfer line. The load may be within the insulated enclosure. The load may comprise at least one of: a semiconductor substrate, a fluid stream for cryogenic separation, a gas to be liquefied, a biological sample, a chemical process, material property analysis equipment, a water vapor trap, an article in a manufacturing process, an imaging device, a subatomic particle detector, a photonic detector, chemical analysis equipment, a superconducting cable, and a superconducting device.

In another embodiment according to the invention, there is provided a system for providing a cooling refrigerant to a load. The system comprises a closed loop primary refrigeration system comprising a compressor taking in the refrigerant at a low pressure and discharging the refrigerant at a high pressure; an expansion valve receiving the refrigerant at the high pressure from the compressor and discharging the refrigerant at the low pressure to an insulated enclosure, the insulated enclosure comprising an inlet receiving the refrigerant from the expansion valve and an outlet returning the refrigerant at the low pressure to the compressor; at least one heat exchanger within the insulated enclosure receiving the refrigerant at the low pressure and cooling the refrigerant using a secondary refrigeration system in heat exchange relationship with the refrigerant; and a supply line delivering the refrigerant at the low pressure to the load and a return line returning the refrigerant from the load to the primary refrigeration system. The system further comprises the secondary refrigeration system, which comprises at least one secondary cryogenic refrigerator. A system control unit controls operation of at least one of the primary refrigeration system and the secondary refrigeration system to provide a variable refrigeration capacity to the load based on at least one of: a pressure of the primary refrigerant delivered to the load, and at least one temperature of the load.

In another embodiment according to the invention, there is provided a method for cooling a load. The method comprises compressing a primary refrigerant in a primary compressor of a closed loop primary refrigeration system, the primary compressor taking in a primary refrigerant at a low pressure and discharging the primary refrigerant at a high pressure; transferring the primary refrigerant at the high pressure from the primary compressor to an inlet of an insulated enclosure, and returning the primary refrigerant at the low pressure from the insulated enclosure to the primary compressor; transferring the primary refrigerant at the high pressure to at least one heat exchanger within the insulated enclosure, and cooling the primary refrigerant in the at least one heat exchanger using heat exchange with a secondary refrigerant from a secondary refrigeration system, the secondary refrigeration system comprising at least one secondary cryogenic refrigerator; expanding the primary refrigerant using an expansion unit within the insulated enclosure, the expansion unit receiving the primary refrigerant at the high pressure from the at least one heat exchanger and discharging the primary refrigerant at the low pressure; delivering the primary refrigerant at the low pressure to the load and returning the primary refrigerant from the load to the primary refrigeration system; and controlling operation of at least one of the primary refrigeration system and the secondary refrigeration system to provide a variable refrigeration capacity to the load based on at least one of: a pressure of the primary refrigerant delivered to the load, and at least one temperature of the load.

In further, related embodiments, the method may further comprise delivering cooling from the secondary refrigeration system to at least one heat transfer surface of the load through a first channel of the secondary refrigeration system, and delivering the secondary refrigerant to the at least one heat exchanger through a second channel of the secondary refrigeration system. The method may further comprise controlling the providing of the variable refrigeration capacity to the load based on at least the pressure of the primary refrigerant delivered to the load. The method may further comprise: controlling at least one of a high pressure, a low pressure and a pressure differential of the primary compressor; controlling a heat source to supply heat to be delivered to the primary refrigerant; controlling operation of an adjustable throttle; controlling flow of the primary refrigerant to bypass at least a portion of the at least one heat exchanger; controlling flow of the primary refrigerant to bypass at least a portion of the primary refrigeration system; controlling a rate of flow of the primary refrigerant; controlling a rate of flow of the secondary refrigerant; controlling a set point temperature of the secondary refrigeration system; controlling a heat source to supply heat to be delivered to the secondary refrigerant; controlling a speed of a secondary compressor of the secondary refrigeration system; controlling flow of the secondary refrigerant to bypass at least a portion of the secondary refrigeration system; controlling flow of at least a portion of the primary refrigerant to warm at least a portion of the load; and/or controlling flow of at least a portion of the secondary refrigerant to warm at least a portion of the load.

In further, related embodiments, the method may comprise delivering the refrigerant at the low pressure to the load through a transfer line out of the insulated enclosure, and returning the refrigerant from the load to the insulated enclosure through the transfer line. The load may be within the insulated enclosure. The load may comprise at least one of: a semiconductor substrate, a fluid stream for cryogenic separation, a gas to be liquefied, a biological sample, a chemical process, material property analysis equipment, a water vapor trap, an article in a manufacturing process, an imaging device, a subatomic particle detector, a photonic detector, chemical analysis equipment, a superconducting cable, and a superconducting device. The method may further comprise moving an object or fluid to be cooled from a heat transfer surface of the load to another portion of the load.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

In accordance with an embodiment of the invention, there is provided a closed cycle cryogenic cooling source to provide a solution for low-temperature ion implantation for use in single-wafer high-throughput ion implanters. In addition, an embodiment according to the invention may be used to provide cooling in a wide variety of other possible applications, such as to cool fluid streams for cryogenic separations, to liquefy gasses, to provide cooling for biological freezers, control reaction rates of chemical processes, to provide cooling for material property analysis equipment, to trap water vapor to produce low vapor pressures in vacuum processes, to cool articles in manufacturing processes such as semiconductor wafer processing and inspection, to cool imaging devices and other instrumentation, subatomic particle and photonic detectors, to cool chemical analysis equipment and to cool superconducting cables and devices. It will be appreciated that the system may be used in other cooling applications.

Figure 1:
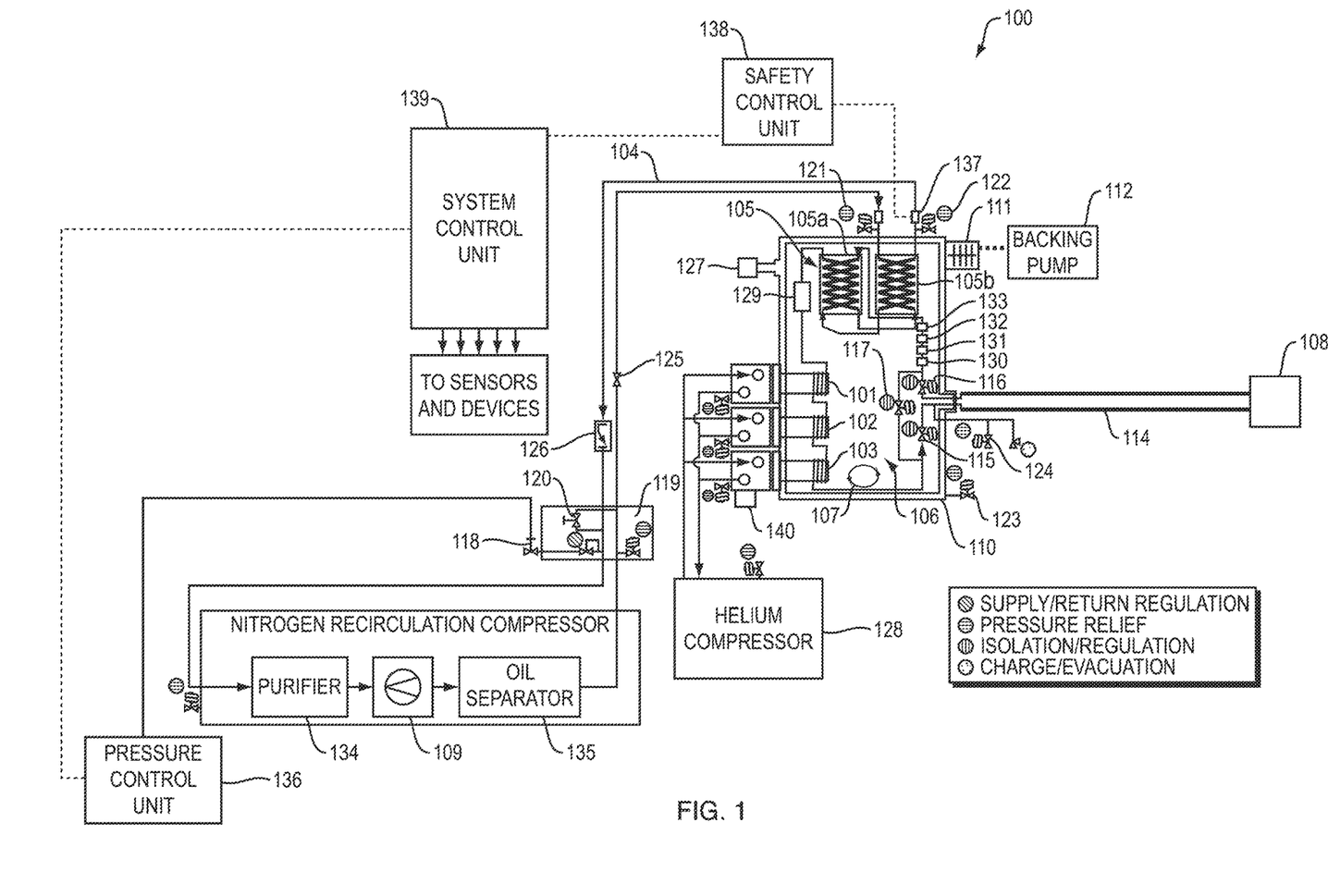
FIG. 1 is a schematic diagram of a cooling system in accordance with an embodiment of the invention.
Figure 2:
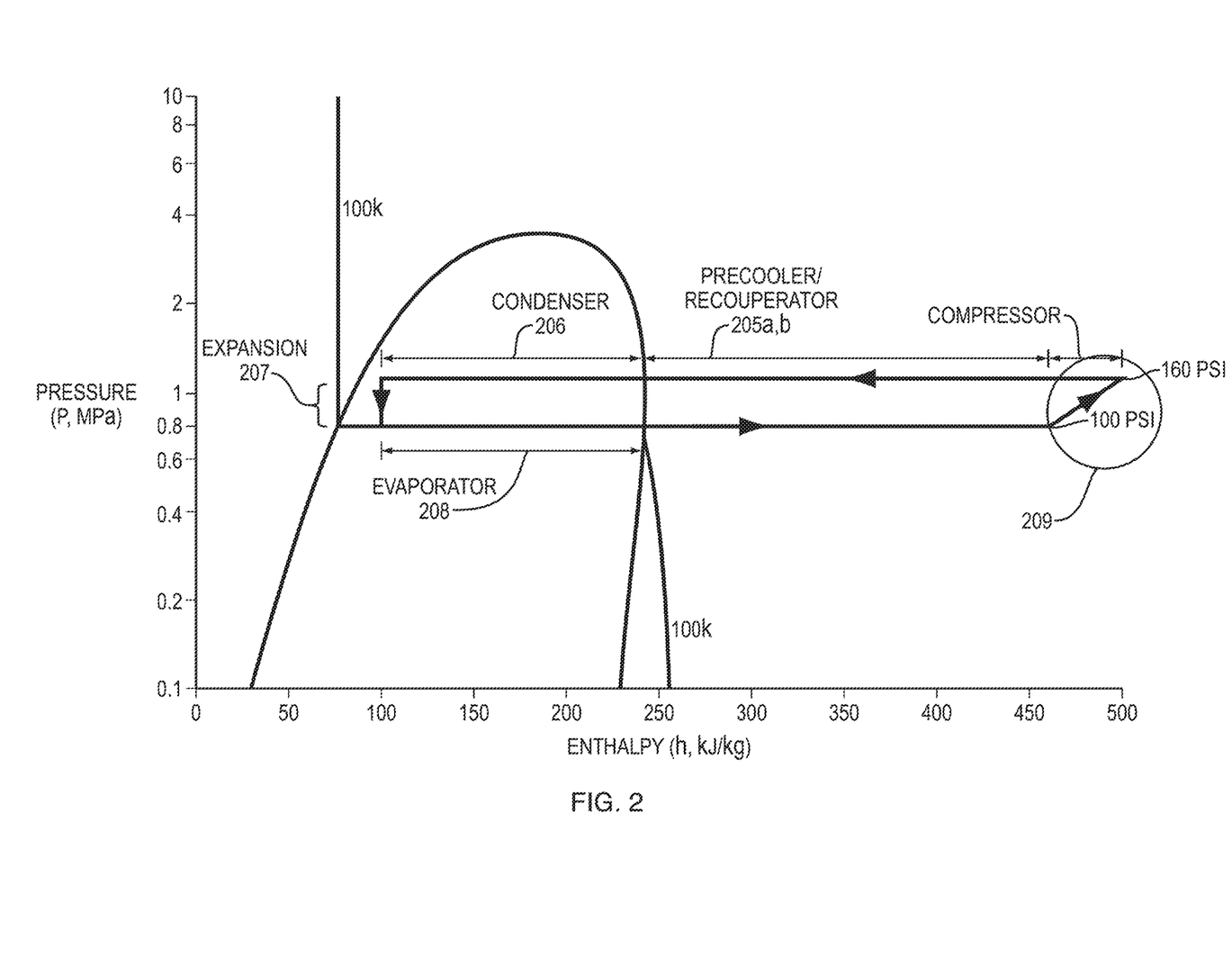
FIG. 2 is a diagram of a thermal cycle of nitrogen gas in accordance with an embodiment of the invention.

FIG. 1 is a schematic diagram of a cooling system 100 in accordance with an embodiment of the invention. In the embodiment of FIG. 1, the system 100 uses cryogenic refrigerators 101/102/103 to cool a recirculating refrigerant, such as a nitrogen stream 104. With reference to the thermal diagram of FIG. 2 in which parallel numbering is used to the components of FIG. 1, the nitrogen is pre-cooled 205a/b in first and second portions 105a/b of a recuperative heat exchanger 105 (which may alternatively be implemented as two separate heat exchangers), condensed 206 using cryogenic refrigerators 101/102/103, expanded 207 using expansion unit 107 (at least a portion of the refrigerant may be changed from a gas state to a liquid state by the cryogenic refrigerators 101/102/103, and/or by the expansion unit 107), and provided 208 to the load 108 where the nitrogen boils, extracting heat to cool the load 108, and returns to the system in gas form. The returned nitrogen is warmed by returning 205a/b through the recuperative heat exchanger 105a/b, while pre-cooling 205a/b the incoming stream by heat exchange between the returning stream and the incoming stream within the recuperative heat exchanger 105a/b. The nitrogen then returns to be recompressed 209 in the compressor package 109. The system 100 may be used for providing cooling to a wafer chuck used in ion implantation during the semiconductor fabrication process, as well as for other applications noted above.

In the embodiment of FIG. 1, the system includes a cryogenic refrigeration system 101/102/103, a nitrogen compressor 109, an insulated enclosure 110 (where heat transfer from the refrigerators 101/102/103 to the recirculating nitrogen stream 104 occurs), valving, flow controls, pressure controls, safety controls, system controls, and purification (all discussed further below). Instead of a recirculating nitrogen stream 104, the system may use a stream of argon, xenon, krypton, another pure refrigerant, a mixed refrigerant, or any refrigerant (such as nitrogen and/or argon) comprising a refrigerant component that boils at a temperature warmer than the boiling point of the refrigerant used in refrigerators 101/102/103. It should be appreciated that as used herein a "refrigerant" may be a mixture of a gaseous and a liquid phase, and the ratio of gas to liquid may change over the course of a refrigeration cycle. The cryogenic refrigeration system 101/102/103 uses helium as the refrigerant through one or more refrigerators 101/102/103 running a Gifford-McMahon (GM) refrigeration cycle. Alternately, a reverse Brayton cycle, a Stirling cycle or a Joule Thomson expansion cycle with either single or mixed refrigerant may be used to provide refrigeration 101/102/103. Instead of helium, the cryogenic refrigeration system 101/102/103 may use a refrigerant comprising another cold boiling refrigerant component, such as neon. One embodiment uses multiple refrigerators 101/102/103, which may be in series or parallel, although a single refrigerator is also possible.

In the embodiment of FIG. 1, the nitrogen compressor 109 uses a hermetically sealed rotary vane pump modified for compressing dry gases; however, a scroll or any other type of pump could also be used. The pump may operate at a variable speed. Alternatively, a constant speed pump may be used. In order to manage the heat of compression, oil may be injected into the nitrogen stream before or during compression by compressor 109. This oil is then removed from the nitrogen stream though an oil separator 135 consisting of a dense pack of fiberglass and a room temperature adsorber with activated charcoal.

Figure 3:
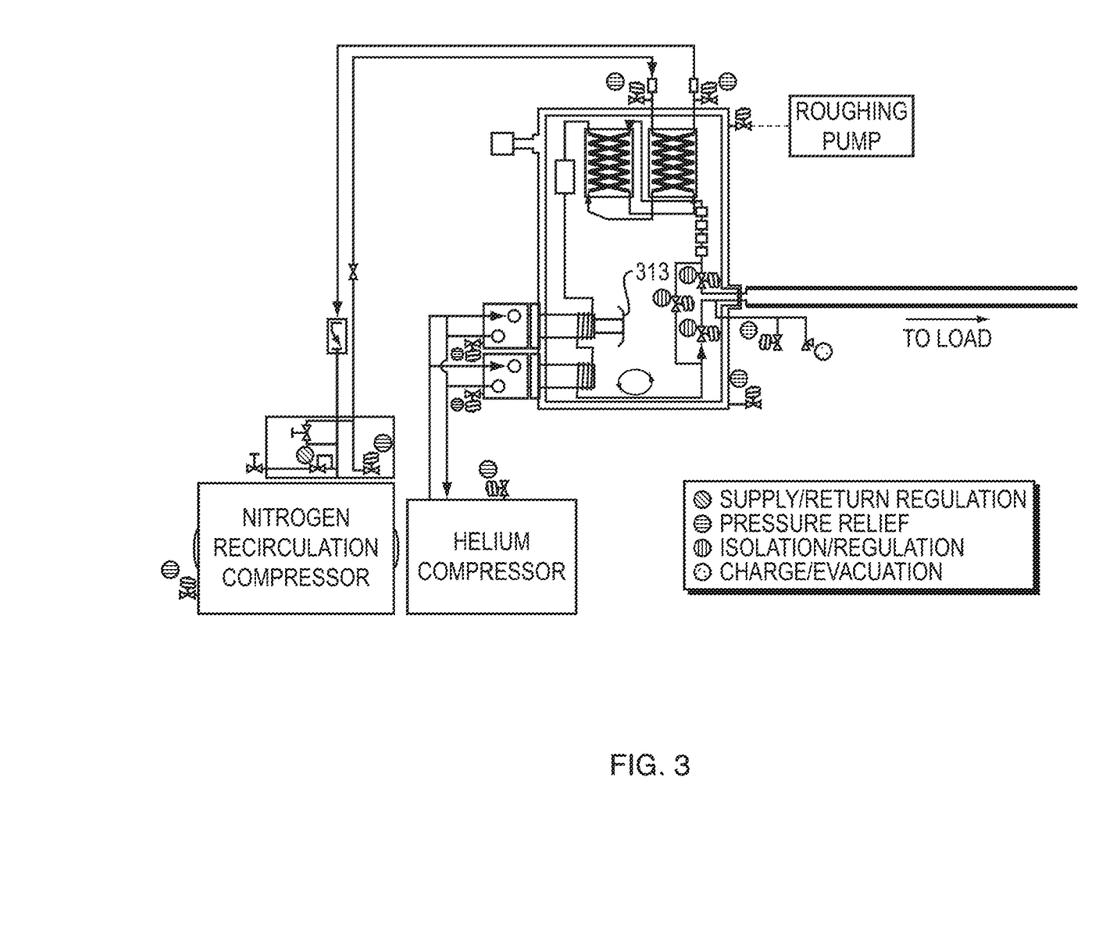
FIG. 3 is a schematic diagram of a cooling system using a second stage cryogenic refrigerator as a cryopump, in accordance with an embodiment of the invention.

In the embodiment of FIG. 1, the insulated enclosure 110 is achieved through creating a low pressure or vacuum envelope around the components that will be below room temperature. The insulating vacuum may be provided by a turbo molecular pump 111, backed by a diaphragm roughing pump 112, but can also be created through cryopumping. For example, a second stage cryogenic refrigerator 313 (see FIG. 3), or another cryogenic refrigerator, could be used as a cryopump to create the vacuum within the enclosure 110. Insulating vacuum is also used along the thermally isolated transfer line 114 carrying the liquid nitrogen to the load 108 to be cooled, either by using a rigid transfer line open to the vacuum space of the insulated enclosure 110, vacuum jacketed bayonette fittings, or by a separately sealed vacuum space along the transfer line 114, either actively pumped or initially brought to a low pressure and sealed. The insulation can also be achieved through other insulation systems such as foam around the cold components.

In the embodiment of FIG. 1, the heat transfer out of the nitrogen into the cryogenic refrigerators 101/102/103 is achieved through direct thermal conduction from the refrigerator 101/102/103 to a mass of copper around which is wound a tubular heat exchanger. The copper mass may be part of the refrigerator or may be joined to the refrigerator in a manner that enables thermal conduction. The copper mass may have a helical scalloped groove to support the tube, which is brazed in place to maximize thermal transfer. Alternately, a D-shaped tube, with a flat on one side, can be used. The tube has a smooth inner diameter, but internal fins, grooves, or a rough finish can be used to increase the internal surface area and improve thermal transfer.

In the embodiment of FIG. 1, the valving comprises two isolation valves 115/116, one 115 on the line supplying liquid nitrogen to the load and one 116 on the line returning the nitrogen boil-off, and a bypass valve 117 which allows the liquid nitrogen to circulate without being sent to the load 108. The valving 115/116/117 allows a mode of operation where the system can be pre-cooled to operating temperatures before refrigeration is applied to the load 108 and the system can be maintained at low temperatures during periods of time where refrigeration is not required at the load 108. The valves can have a thermally isolated actuation device, whether manual, pneumatic, or electrical, which minimizes the heat leak from the valves to the external environment. The thermal isolation is achieved through thin wall tubes, with our without cut-outs which can further reduce the cross sectional area between the valve body and the actuation device. Thermal isolation can also be achieved through the use of materials with low thermal conductivities.

In the embodiment of FIG. 1, flow control may be achieved through the use of a capillary tube 107 explicitly sized for the temperatures, pressures, percent of liquid saturation, and desired flow of the system. The capillary 107 is placed between the refrigerators 101/102/103 and the line 114 supplying liquid nitrogen to the load, but the location can be varied in the system. Alternate methods of flow control include a warm throttle valve or other expansion valve which switches in an orifice between the compressor 109 and the warm heat exchanger 105, a valve with a variable flow area, a spring biased valve, or by varying the speed of the compressor 109.

In the embodiment of FIG. 1, a semiconductor device that is being manufactured may be pre-cooled to reduce the required cooling refrigerant at the electrostatic chuck. For example, a flow line (not shown) may divert nitrogen from a location in nitrogen loop 104 to a pre-cooling chamber (not shown).

In the embodiment of FIG. 1, pressure control is provided by a pressure regulator 118 between a source of nitrogen and the return side of the nitrogen compressor, a high side pressure control valve 119, a bypass regulator 120, and the speed of the compressor 109. The pressure regulator 118 allows gas to be drawn from the source of nitrogen to compensate for the volume difference between gaseous and liquid nitrogen and maintain pressure as the nitrogen is being condensed and therefore controls the minimum pressure for the return side of the nitrogen compressor. The nitrogen source could be either from a high pressure cylinder, the facility nitrogen source in the semiconductor fabrication plant or a local nitrogen generator. The pressure regulator 118 is set to a constant value, but could also be actively controlled by a pressure control unit 136 to modify the gas flow into the system which would allow the temperature at which refrigeration is applied to the load 108 to be varied dynamically. The high side pressure control valve 119 limits the supply side pressure when the nitrogen in the system is boiling off, either under conditions of increasing load, or when the system is being shut down. The bypass regulator 120 is placed between the high pressure side and low pressure side of the nitrogen compressor 109 and controls the power required by the compressor 109 and, in conjunction with the high side pressure control valve 119, the maximum pressure of the return side of the compressor 109. The compressor speed and the pressure regulator setting define the minimum pressure of the supply side of the compressor 109. The speed of the compressor 109 may be varied. Alternatively, the speed of the compressor 109 may be constant.

In the embodiment of FIG. 1, safety controls are provided through relief valves 119/121/122/123/124 on the nitrogen lines and insulated enclosure 110 and a relief valve on the compressor 109, isolation valves 125/126 on the nitrogen stream, and a thermal sensor 137. The relief valves 119/121/122/124 on the nitrogen lines are installed on any volume that could be potentially isolated through operation of the valves or disconnection of the lines carrying nitrogen from the compressor 109 to the insulated enclosure 110. The relief valve 123 on the vacuum space 110 is sized to prevent over pressurization of the enclosure 110 in the event of a nitrogen line break and subsequent boil-off within the enclosure 110. The isolation valve 125 on the nitrogen stream is controlled by a pressure gauge 127 on the insulating enclosure 110. If the gauge 127 senses a high pressure, such as above 1 micron, a relay on the gauge 127 trips, cutting power to the isolation valve 125 which is a normally closed configuration and which therefore closes. This prevents nitrogen from the source of supply from continuing to enter the enclosure 110 in case of a nitrogen line break or vacuum leak which would lead to evaporation of liquid nitrogen in the nitrogen lines. A thermal sensor 137 monitors the temperature of the nitrogen leaving the insulated enclosure 110 to return to compressor 109 and will stop operation of the refrigerators 101/102/103 (or reduce refrigeration provided by them) if the temperature is low enough to create a touch hazard.

In the embodiment of FIG. 1, the system control unit 139 includes one or more control units configured to adjust the amount of refrigeration power available to avoid either overcooling or undercooling the system, allowing the system to provide the proper amount of refrigeration to the load 108 without creating a hazardous situation. Further operation of the control units that are implemented by system control unit 139 is discussed below. It will be appreciated that system control unit 139 is electrically connected to various sensors and devices discussed herein, including sensors 130, 131, 133, 137, small heater 132, compressors 109 and 128, and other sensors and devices as necessary to control operation of the system as described herein. The system control unit 139 includes appropriate electronic hardware, including specially programmed microprocessors or other specially programmed electronics to implement the control techniques described herein. Further, it will be appreciated that where a "control unit" is discussed herein it may be implemented as a subunit of the system control unit 139, such as by a subroutine or subcomponent of a microprocessor or other electronic hardware of the system control unit 139. In order to prevent overcooling or undercooling, the system control unit 139 adjusts the speed of the cryogenic refrigerators 101/102/103 and/or helium compressor 128 and/or turns off one or more of the refrigerator units 101/102/103. This results in a change in the percent of the flow to the load 108 that is in liquid phase, as opposed to gaseous phase. In normal operation, i.e., not overcooled or undercooled, the refrigerators 101/102/103 are allowed to run at different speeds, although they could also be constrained to all run at the same speed to balance the refrigeration load across all refrigerators. It should also be appreciated that one or more of the cryogenic refrigerators 101/102/103 may be of different sizes or different refrigeration types, or all of the cryogenic refrigerators may be the same size and refrigeration type. In addition, the control units may provide the cryogenic refrigerators 101/102/103 with control parameters (such as a maximum or minimum refrigerator speed) within which the cryogenic refrigerators must run, while allowing the cryogenic refrigerators to perform local control (using one or more on-board local processors) within the maximum and minimum parameters. Further, the control units may control the setpoint temperature of the refrigerators 101/102/103 directly, rather than controlling speed of the refrigerators directly. The refrigerators 101/102/103 may be controlled to have different setpoint temperatures.

In the embodiment of FIG. 1, other options exist to adjust the available refrigeration. For instance, a variable heater 140 could be used to reduce the amount of refrigeration applied by cryogenic refrigerators 101/102/103 running at either a constant or variable speed. Another method would be to use a valve to route the nitrogen flow around the return side heat exchanger 105b, preventing or allowing precooling of the incoming nitrogen before it reaches the cryogenic refrigerators 101/102/103. A portion of the flow could also be routed to a warmer surface in the system to reduce the refrigeration applied to the load 108. The available refrigeration could also be adjusted by changing the flow in the nitrogen stream with either a variable speed compressor 109 or by pulsing the flow by turning a constant speed compressor on and off.

In the embodiment of FIG. 1, for the system controls to be effective, the system may be able to detect both under-refrigerated and over-refrigerated conditions. Detection of under refrigeration may be done by measuring the pressure on the return line of the nitrogen circuit using a pressure transducer 130, which determines the boiling point of the liquid nitrogen, which is then calculated. Data from a temperature sensor 131 on the return line is then compared with the calculated value. If the measured temperature is more than a preset temperature difference above the calculated temperature, it is an indication that the system is not returning liquid or near liquid nitrogen from the load 108 and can make use of more refrigeration. The refrigerators 101/102/103 are then commanded to increase their available refrigeration through means such as increasing their speed. The detection of an under-refrigerated condition can be also achieved through other means, such as a complete model of the thermodynamic system and comparing system parameters such as inlet and outlet temperatures, inlet and outlet pressures, and flows. Another method is to monitor the return temperature using temperature sensor 131 and, when it reaches an assumed saturation temperature point, turn on a small heater 132 downstream of temperature sensor 131. A second temperature sensor 133 downstream of the small heater 132 is then monitored to see if the addition of the small amount of heat raised the temperature of the nitrogen. If it did, the nitrogen stream is exceeding a set level of superheat and more refrigeration is needed.

In the embodiment of FIG. 1, detection of over-refrigeration is important for safety and potentially energy efficiency reasons. Over-refrigeration may be monitored by looking at the temperature at an intermediate point through the recuperative heat exchanger 105a/b, or alternately at either end. If this temperature falls below a pre-set level, the system adjusts to reduce available refrigeration. A secondary control thermal sensor 137 monitors the temperature of the nitrogen leaving the heat exchangers 105a/b and returning to the compressor 109. If this value falls below a temperature considered to be a touch hazard, all refrigerators 101/102/103 are disabled by a safety control unit 138 and the system operation is locked out. Another method is to monitor the return temperature using a temperature sensor 131 and, when it reaches an assumed saturation temperature point, turn on a small heater 132 downstream of the point 116 where the temperature sensor 131. A second temperature sensor 133 downstream of the small heater 132 is then monitored to see if the addition of the small amount of heat raised the temperature of the nitrogen. The magnitude of the amount of heat needed to raise the temperature is an indicator of whether there is over-refrigeration. In addition, temperatures at specific locations such as at the load may be used for feedback control of increasing or decreasing refrigeration to the load. Decreasing refrigeration to the load may be accomplished by reducing the refrigeration produced by refrigerators 101/102/103 and/or by diverting flow from the load through bypass valve 117.

In addition, in an embodiment according to the invention in which there is two-phase flow of the refrigerant (i.e., the refrigerant includes a liquid and a gaseous phase), the system control unit 139 may regulate the temperature of the load using information regarding the pressure of the refrigerant entering the load (i.e., refrigerant inlet pressure to the load), and without the need to receive temperature feedback. This is possible because of the pressure/temperature relationship of a two-phase mixture. In one embodiment, both the inlet pressure and a downstream temperature of the load may be used to permit the system control unit 139 to regulate the temperature of the load; in another embodiment, only the inlet pressure may be used. Where control techniques are described herein as being based on one or more temperatures, similar techniques may therefore also be used based on pressure and temperature or only on pressure.

In the embodiment of FIG. 1, purity of the recirculating nitrogen may be ensured through several methods in the system. First, the gas from the source of nitrogen supply outside of the system is passed through a purifier 134 using either heated or un-heated getter material to remove impurities. Within the nitrogen compressor 109, the oil introduced into the nitrogen stream is removed though an oil separator 135 consisting of a dense pack of fiberglass and a room temperature adsorber with activated charcoal, which also removes water and other gaseous contaminants. Finally, the nitrogen stream is passed through a cold adsorber 129 within the insulated enclosure 110. Care is taken to reduce the introduction of contaminants in the use of the system as well. Isolation valve 126 may allow for room temperature or heated nitrogen to be introduced into the system to warm the load, and pressure regulator 118 may be used to ensure that positive pressure is always maintained within the nitrogen stream.

Figure 4:
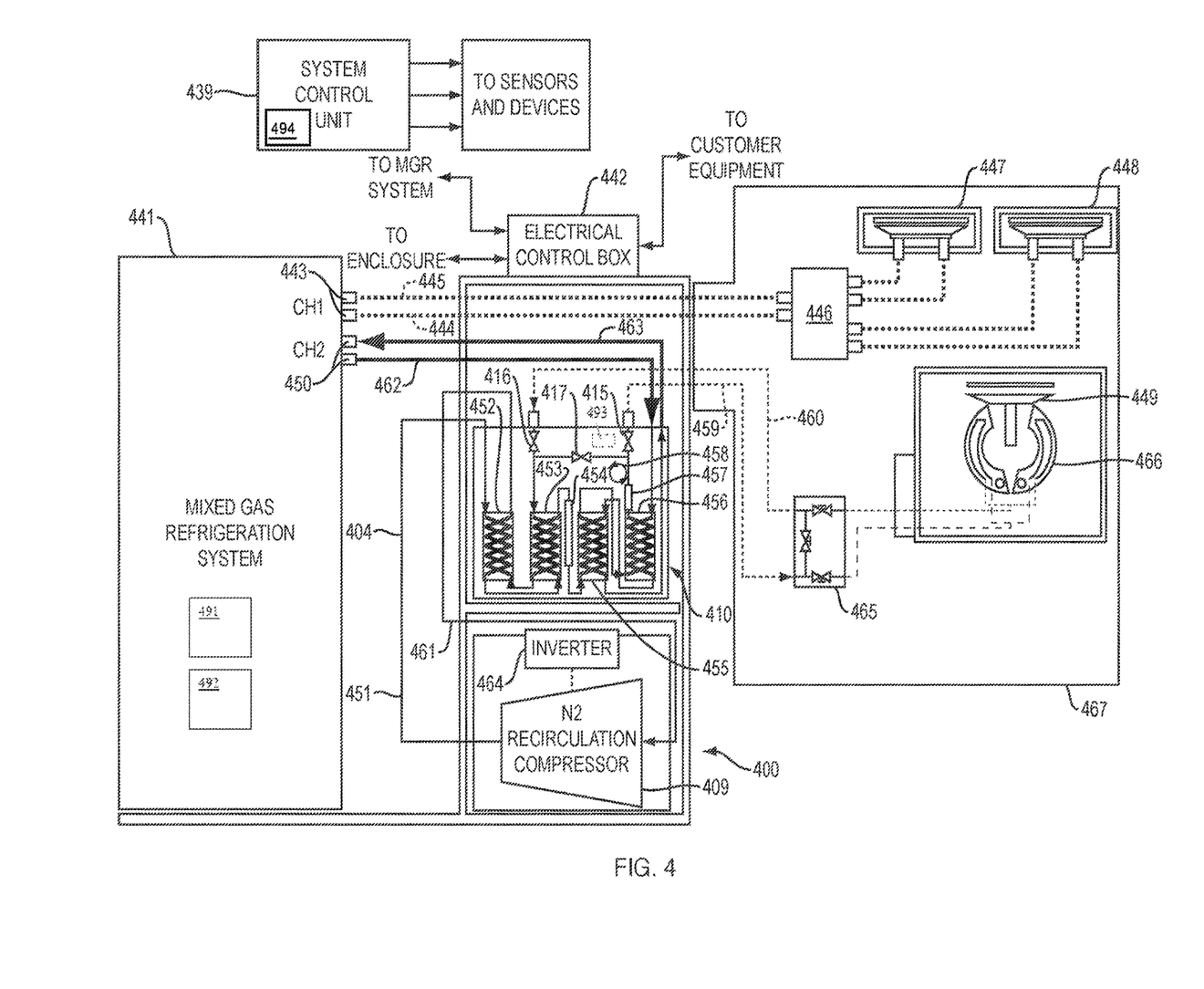
FIG. 4 is a schematic diagram of a high throughput cooling system in accordance with an embodiment of the invention.

FIG. 4 is a schematic diagram of a high throughput cooling system 400 in accordance with an embodiment of the invention. In the embodiment of FIG. 4, the system 400 uses a dual channel mixed gas refrigerant system 441 to permit pre-cooling of a substrate to be cooled, in addition to cooling a recirculating refrigerant such as a nitrogen stream 404. The cooling system 400 includes the mixed gas refrigerant system 441, a nitrogen recirculation compressor 409, an insulated enclosure 410, and an electrical interface control box 442. The electrical interface control box 442 may be separate from, or integral with, the electronics for controlling the mixed gas refrigeration system 441. In the insulated enclosure 410, heat transfer from the mixed gas refrigeration system 441 to the recirculating nitrogen stream 404 occurs. The insulated enclosure 410 in the embodiment of FIG. 4 contains foam insulation, although vacuum insulation as in the embodiment of FIG. 1 may be used instead. The insulated enclosure 410 may include cold components discussed below, which are insulated, while the nitrogen compressor 409 is located outside of the insulated enclosure 410 and is at a warmer temperature, such as room temperature.

In the embodiment of FIG. 4, a first channel 443 of the mixed gas refrigeration system 441 circulates mixed gas refrigerant to pre-cooling equipment, for example to pre-cool a semiconductor device that is being manufactured in order to reduce the required cooling refrigerant at an electrostatic chuck. In FIG. 4, the first channel 443 includes a first channel mixed gas refrigerant supply line 444 to carry mixed gas refrigerant to the pre-cooling equipment, and a first channel mixed gas refrigerant return line 445 to return the mixed gas refrigerant from the pre-cooling equipment. The pre-cooling equipment may, for example, include a pre-cool cryogenic interface module 446, which cools heat transfer surfaces in one or more pre-cool chambers 447, 448; or the mixed gas refrigerant may be circulated directly to the heat transfer surfaces in pre-cool chambers 447, 448. In addition, the mixed gas refrigerant may be circulated to any heat transfer surface in the load, which may or may not be pre-cooling equipment and regardless of whether pre-cooling equipment is used. Further, an embodiment according to the invention may be used to cool two different loads at two different temperatures, including where one of the loads is not a pre-cool chamber for the other load. In addition to loads such as semiconductor substrates discussed herein, any other load may be cooled by an embodiment according to the invention. For example, the load may include a fluid stream for cryogenic separation, a gas to be liquefied, a biological freezer or other biological sample, a chemical process, material property analysis equipment, a water vapor trap for vacuum processes, an article in a manufacturing process, an imaging device or other instrumentation, a subatomic particle or photonic detector, chemical analysis equipment or a superconducting cable or device. Other loads may be cooled.

In accordance with one embodiment of the invention, the pre-cool chambers 447, 448 may, for example, be used to cool semiconductor substrates to a temperature in the range of from about −40 C to about −100 C, after which the substrates may be transferred to an electrostatic chuck 449 upon which ion implantation or other processes are performed on the substrates. In accordance with an embodiment of the invention, nitrogen directed out of the insulated enclosures (such as 110 and 410) may, for example, be used to achieve a target temperature of from about −80 C to about −250 C, such as from about −150 C to about −190 C, which may be the temperature at a cold pad cryogenic interface module 465, a platen 466, an electrostatic chuck 449, or another location at the load. By virtue of the pre-cooling of semiconductor substrates in the pre-cool chambers 447, 448, an embodiment according to the invention permits a higher throughput rate for the semiconductor manufacturing equipment, because the semiconductor substrates require less time to be cooled to a desired low temperature at the electrostatic chuck 449 when the substrates have already been pre-cooled in the pre-cool chambers 447, 448.

In the embodiment of FIG. 4, a second channel 450 of the mixed gas refrigeration system 441 circulates mixed gas refrigerant through heat exchangers contained within the insulated enclosure 410 in order to remove heat from a separate nitrogen gas loop 404 passing though a separate channel of the same heat exchangers. In the embodiment of FIG. 4, the nitrogen loop 404 may circulate essentially all of the nitrogen in a gaseous state throughout the closed loop 404, although a mixture of liquid and gas may be circulated as described above for the embodiment of FIG. 1. In the nitrogen loop 404, the nitrogen is compressed by nitrogen compressor 409 and delivered via nitrogen supply line 451 to one side of a first heat exchanger 452, from which the nitrogen flows to one side of a second heat exchanger 453. In the first and second heat exchangers 452, 453, the nitrogen is cooled by nitrogen returning from the load. After the second heat exchanger 453, the nitrogen flows through an optional heater 454 to one side of a third heat exchanger 455, from which the nitrogen flows to one side of a fourth heat exchanger 456. In the third and fourth heat exchangers 455, 456, the nitrogen is cooled by mixed gas refrigerant (from the mixed gas refrigeration system 441), flowing through the other sides of the third and fourth heat exchangers 455, 456. The nitrogen exits the fourth heat exchanger 456, flows through an adsorber 457 to remove impurities, and is expanded through an expansion unit, such as a capillary tube 458 or throttle valve. The expansion unit is used to regulate the flow of the nitrogen as well as to provide additional cooling through a gas expansion effect. Following expansion, the nitrogen exits the insulated enclosure 410 through nitrogen line 459 to cool the load, and is returned from the load through return line 460 to the insulated enclosure 410. The returning nitrogen is provided to the other side of the second heat exchanger 453, and from there to the other side of the first heat exchanger 452, in order to be warmed and to cool the incoming nitrogen stream in the first and second heat exchangers 452 and 453. From the first heat exchanger 452, the nitrogen returns to the compressor 409 via return line 461 to be compressed.

In this way, in the embodiment of FIG. 4, the first two heat exchangers 452, 453 are used for recuperative heat exchange between the cold nitrogen gas returning 460 from the load and the supply gas 451 entering the insulated enclosure 410 from the nitrogen compressor 409. The third and fourth heat exchangers 455, 456 are used to transfer heat between the mixed gas refrigerant (from the second channel 450 of the mixed gas refrigerant system 441), and the nitrogen gas that has exited the first two heat exchangers. The mixed gas refrigerant is supplied to the fourth heat exchanger 456 by mixed gas supply line 462 of the second channel 450 of the mixed gas refrigeration system 441, is flowed through one side of each of the fourth and third heat exchangers 456, 455, and from there returns by mixed gas return line 463 of the second channel 450 to the mixed gas refrigeration system 441. The heater 454 may be used to prevent the mixed gas refrigerant from freezing in the heat exchangers 455, 456.

In the embodiment of FIG. 4, the pressure difference between the supply and return sides of the nitrogen compressor 409 (for instance, the pressure difference between the nitrogen supply line 451 and the nitrogen return line 461), may be controlled in order to achieve a desired nitrogen flow rate and expansion level as the nitrogen is passed through the capillary tube 458. In addition, an electronic inverter 464 may be used to reduce the speed of compressor 409, in order to reduce the nitrogen flow rate exiting the compressor 409.

In the embodiment of FIG. 4, valves 415/416/417 may be used in a similar fashion to that described above for valves 115/116/117 of FIG. 1. In particular, the valving may comprise two valves 415/416, one 415 on the line supplying nitrogen to the load and one 416 on the line returning the nitrogen from the load, and a bypass valve 417 which allows the nitrogen to circulate without being sent to the load. The valving 415/416/417 allows a mode of operation where the system can be pre-cooled to operating temperatures before refrigeration is applied to the load and the system can be maintained at low temperatures during periods of time where refrigeration is not required at the load. The valves 415/416/417 need not be vacuum valves where the insulated enclosure 410 is not vacuum insulated, although they may be so when vacuum insulation is used.

The embodiment 400 of FIG. 4 may be used to interface with equipment operated by an end-user for semiconductor fabrication or other applications. For example, the customer equipment may include one or all of a cold pad cryogenic interface module 465, a platen 466, an electrostatic chuck 449, a pre-cool cryogenic interface module 446, and one or more pre-cool chambers 447, 448. The nitrogen lines 459 and 460 exiting and returning to the insulated enclosure 410 may be connected with such customer equipment, as may be the mixed gas refrigerant supply and return lines 444 and 445. The customer equipment may, for example, include the equipment shown in portion 467 of FIG. 4.

In the embodiment of FIG. 4, an electrical interface control box 442 provides an electrical interface between the customer equipment 467, the mixed gas refrigeration system 441 and the systems within the insulated enclosure 410. The electrical interface control box 442 may for example, have as inputs or outputs one or more of the following, or other electrical signals regarding the state of such components: an input electronic signal indicating a temperature at a remote location, such as the pre-cool chambers 447, 448; an input electronic signal indicating a temperature control set-point for the remote location such as electrostatic chuck 449 or platen 466; an input electronic signal indicating whether coolant is to flow from the first channel 443 of the mixed gas refrigeration system 441; an input electronic signal indicating whether coolant is to flow from the second channel 450 of the mixed gas refrigeration system 441; an output electronic signal indicating cold is ready at the first channel 443 of the mixed gas refrigeration system 441; an output electronic signal indicating cold is ready at the second channel 450 of the mixed gas refrigeration system 441; output electrical signals indicating the temperatures of the supply and return nitrogen in lines 459 and 460; output electrical signals indicating the temperatures of the mixed gas refrigerant supply and return lines 462 and 463; an output electrical signal indicating a feedback for the mixed gas refrigeration system 441; an output electrical signal indicating a fault in one or more of the nitrogen loop 404 or either channel of the mixed gas refrigeration system 441; an output electrical signal indicating cold source power on. The electrical interface control box 442 may be used to provide electrical control of one or more systems or subsystems, for example to control operation of the first channel 443 of the mixed gas refrigeration system 441 such that a specified temperature is maintained at a remote point, such as at one or more of the pre-cooling chambers 447 and 448. For instance, the electrical interface control box 442 may pulse on and off the operation of the first channel 443 of the mixed gas refrigeration system 441 in order to control the temperature at such a remote location. In addition to the electrical interface control box 442, the embodiment of FIG. 4 includes a further system control unit 439, which may be a separate unit connected with the electrical interface control box 442 or may be integrated with it. The system control unit 439 includes one or more control units 494 configured to adjust the amount of refrigeration power available to avoid either overcooling or undercooling the system, allowing the system to provide the proper amount of refrigeration to the loads (including, for example, both the pre-cooling equipment 446/447/448 and cold pad cryogenic interface module 465) without creating a hazardous situation. Further operation of the control units that are implemented by system control unit 439 is discussed below. It will be appreciated that system control unit 439 is electrically connected to various sensors and devices discussed herein, including heater 454, compressor 409, valves 415/416/417, and other sensors and devices as necessary to control operation of the system as described herein. The system control unit 439 includes appropriate electronic hardware, including specially programmed microprocessors or other specially programmed electronics to implement the control techniques described herein. Further, it will be appreciated that where a "control unit" is discussed herein it may be implemented as a subunit of the system control unit 439, such as by a subroutine or subcomponent of a microprocessor or other electronic hardware of the system control unit 439.

In the embodiment of FIG. 4, the system control unit 439 controls the delivery temperatures to the load, including, for example, any or all of the pre-cooling equipment 446/447/448, cold pad cryogenic interface module 465, platen 466 and electrostatic chuck 449. In order to control operation of the nitrogen loop 404 to control such delivery temperatures, several different possible techniques may be used, either alone or in combination. In each case, the system control unit 439 may receive a reading of one or more temperatures at remote locations in the load, by receiving an electronic signal from one or more temperature sensors (not shown), and in response may control operation of one or more devices via electronic signals to those devices, from one or more control units used for such purposes. The system control unit 439 may therefore implement a feedback loop to control delivery temperatures to the load. The control may be continuous and closed loop, or alternatively, the control may be open loop and need not be continuous. In addition, in an embodiment according to the invention in which there is two-phase flow of the refrigerant (i.e., the refrigerant includes a liquid and a gaseous phase), the system control unit 439 may regulate the temperature of the load using information regarding the pressure of the refrigerant entering the load (i.e., refrigerant inlet pressure to the load), and without the need to receive temperature feedback. This is possible because of the pressure/temperature relationship of a two-phase mixture. In one embodiment, both the inlet pressure and a downstream temperature of the load may be used to permit the system control unit 139 to regulate the temperature of the load; in another embodiment, only the inlet pressure may be used. Where control techniques are described herein as being based on one or more temperatures, similar techniques may therefore also be used based on pressure and temperature or only on pressure.

In one example of control by the system control unit 439, in the embodiment of FIG. 4, the discharge rate from the nitrogen compressor 409 may be controlled by the system control unit 439 in response to one or more temperatures at one or more remote locations in the load. The speed of the nitrogen compressor 409 may be varied, or the nitrogen compressor 409 may be turned on and off, by the system control unit 439. The system control unit 439 may control the high pressure (supply pressure) of the nitrogen compressor 409, for example the pressure at nitrogen supply line 451. Further, the system control unit 439 may control the low pressure (return pressure) of the nitrogen compressor 409, for example the pressure at nitrogen return line 461. Further, the system control unit 439 may control the pressure differential between the high pressure and the low pressure of the nitrogen compressor 409; or may control two or more of the pressure differential, the high pressure and the low pressure of the nitrogen compressor 409. The system control unit 439 may control the heat supplied to the flowing nitrogen loop 404, for example using an electronic signal to heater 454, another heater, or another heat source. The system control unit 439 may use an electronic signal to control an adjustable throttle, which would be used in place of capillary tube 458. The system control unit 439 may use an electronic signal to switch flow (for example by providing electronic signals to one or more valves) through a hot gas bypass (not shown) in the nitrogen loop 404, for example, to direct flow of the nitrogen to bypass some portions (or all of) of one or more of the heat exchangers 452, 453, 455, 456, resulting in short-circuiting of the cooling loop for the nitrogen. The system control unit 439 may use an electronic signal to switch flow (for example by providing electronic signals to one or more valves) through a bypass (not shown) from any location in the nitrogen loop 404 (for example, from the compressor 409, from a room temperature portion or from another warm portion of the nitrogen loop 404) to provide warm gas to a location in the load, such as the platen 466 and/or electrostatic chuck 449, in order to warm such location quickly for servicing. The system control unit 439 may use an electronic signal to switch flow (for example by providing electronic signals to one or more valves) through a bypass (not shown) anywhere in the nitrogen loop 404 that causes the mixing of hot gas from a warmer section of the nitrogen loop 404 (for example, a room temperature portion of the nitrogen loop 404) with a downstream, colder section of the nitrogen loop 404. In the case of flow bypasses, the system control unit 439 may use an electronic signal to control a valve (not shown) to have on/off, proportional, or throttling operation.

In the embodiment of FIG. 4, part or all of the control techniques implemented by system control unit 439 may be to perform a calculation of the bypass mixing or on/off time needed to generate the desired delivery temperature to the load, rather than, or in addition to, performing a continuous regulation of the desired temperature based on continuous feedback of a reading of that temperature. Further, the system control unit 439 could perform a calculation of how much mixing or on/off time is needed, based on pressure and valve position rather than, or in addition to, performing other types of control.

In the embodiment of FIG. 4, in order to control operation of the nitrogen loop 404 and/or to control operation of the mixed gas refrigeration system 441 in order to control the delivery temperatures to the load (such as pre-cooling equipment 446/447/448, cold pad cryogenic interface module 465, platen 466 and/or electrostatic chuck 449), several further different possible techniques may be used, either alone or in combination. The system control unit 439 may control the refrigerant flow rate of either or both of the mixed gas refrigeration system 441 or the nitrogen loop 404 by providing electronic signals to one or more valves, which may be proportional or on/off valves. For example, such valves may be located at the supply outputs 444, 462 of either or both of the first and second channels 443, 450 of the mixed gas refrigeration system 441 or at the nitrogen supply lines 451 or 459. The system control unit 439 may change the set point temperature of the mixed gas refrigeration system 441. The system control unit 439 may control one or more heaters to heat one or more of the mixed gas refrigerant or the nitrogen loop. The system control unit 439 may regulate the speed of the compressor of the mixed gas refrigeration system 441. The system control unit 439 may control flow through a bypass line (for example using one or more valves) from a warmer section of the mixed gas refrigeration system 441 (such as a warmer heat exchanger in a cascade system, or such as a room temperature portion of the mixed gas refrigeration system 441) to a colder portion of the system 400. The system control unit 439 may use an electronic signal to switch flow (for example by providing electronic signals to one or more valves) through a bypass (not shown) from a location in the mixed gas refrigeration system 441, such as a defrost loop (not shown) of the system 441, to provide warm gas to a location in the load, such as pre-cool equipment 446/447/448, in order to warm such location quickly for servicing.

In another embodiment similar to that of FIG. 4, both the first channel 443 of the mixed gas refrigeration system 441 and the nitrogen supply and return lines 459, 460 may be used to improve cool-down time of the cold pad cryogenic interface module 465, platen 466 and/or electrostatic chuck 449. This may be done, for example, by having separate bypass lines (not shown) from the mixed gas refrigerant supply and return lines 444 and 445 of the first channel 443 to the cold pad cryogenic interface module 465.

The embodiment of FIG. 4 may include devices for detecting both under-refrigerated and over-refrigerated conditions, in a similar fashion to those described above for FIG. 1. Instead of a recirculating nitrogen stream 404, the system may use a stream of argon, xenon, krypton, helium, another pure refrigerant or a mixed refrigerant. Similar types of compressors may be used as discussed above for FIG. 1. Heat transfer from the mixed gas refrigerant lines 462/463 to the heat exchangers 455, 456 may be performed using similar techniques for thermal conduction as those described above for FIG. 1. Similar methods of flow control may be used as discussed above for FIG. 1. Similar methods of pressure control may be used as discussed above for the nitrogen compressor 109 of FIG. 1. Similar safety controls may be used as discussed above for FIG. 1, although some may not be necessary where vacuum insulation of the insulated enclosure 410 is not used. Similar techniques for control of refrigerant purity may be used as discussed above for FIG. 1. Alternative refrigeration such as reverse Brayton may be used to provide cooled refrigerant to both channels of a system according to an embodiment of the invention. In addition, the number of heat exchangers required may be varied depending on cooling requirements and heat exchanger design.

Figure 5:
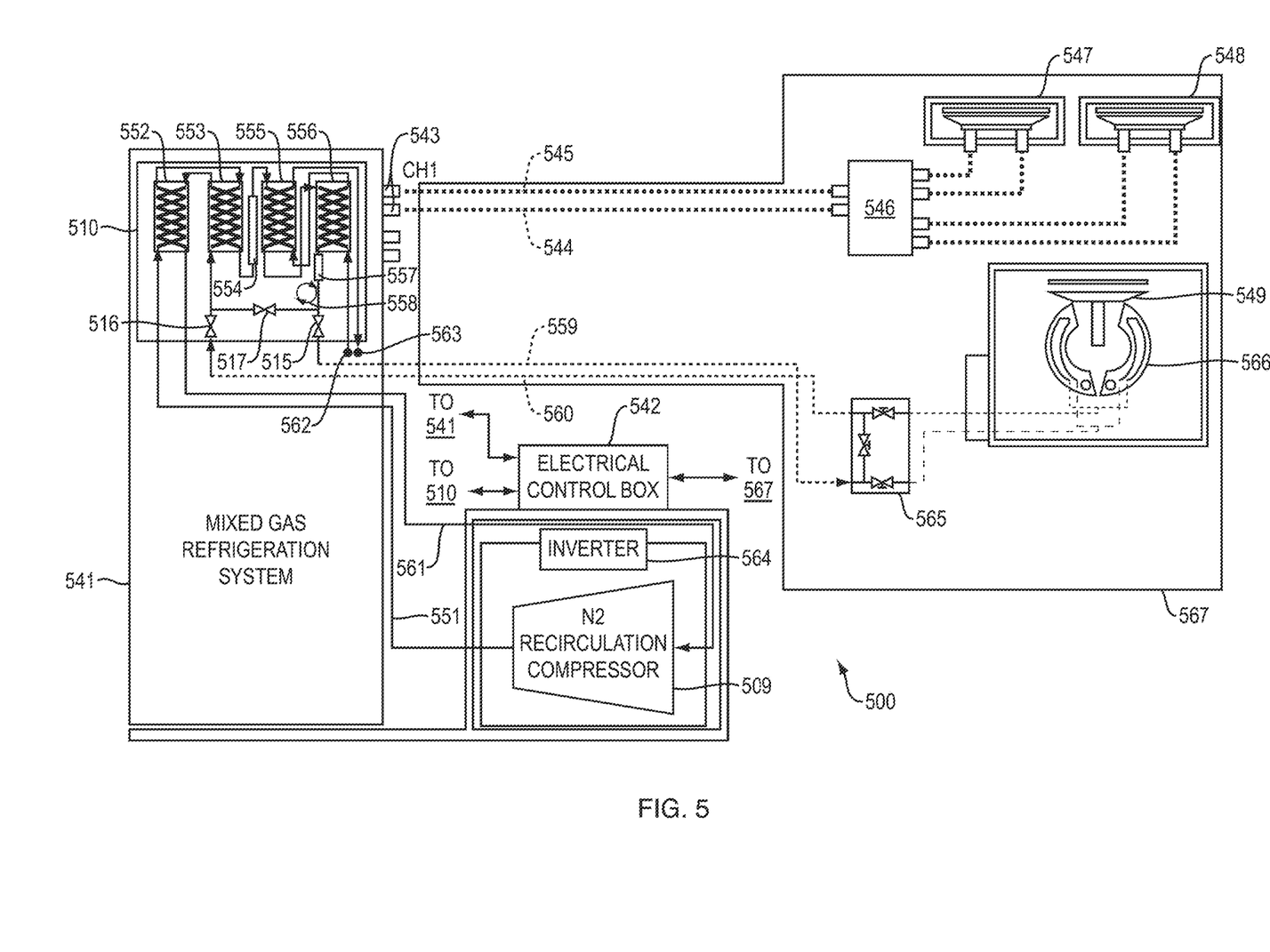
FIG. 5 is a schematic diagram of a high throughput cooling system with an insulated enclosure integrated into a mixed gas refrigeration system, in accordance with an embodiment of the invention.

FIG. 5 is a schematic diagram of a high throughput cooling system 500 in accordance with an embodiment of the invention, which is similar to the embodiment of FIG. 4 except that the insulated enclosure 510 is integrated into mixed gas refrigeration system 541. Heat exchangers 552, 553, 555 and 556, capillary tube 558, heater 554, adsorber 557, valves 515/516/517 are all located within enclosure 510 in the mixed gas refrigeration system 541. The nitrogen supply and return lines 551 and 561 are fed into the enclosure 510 within the mixed gas refrigeration system 541; and the nitrogen lines 559/560 to and from the load are fed from the mixed gas refrigeration system 541 to the load. Mixed gas is supplied at 562 to cool the nitrogen loop from mixed gas supply lines within the mixed gas refrigeration system 541, and mixed gas returns at 563 from having cooled the nitrogen loop. A first channel 543 operates similarly to that of FIG. 4, using mixed gas lines 544 and 545 to supply and return mixed gas refrigerant to and from the customer pre-cooling equipment 546 and/or 547/548. No second channel exiting the mixed gas refrigeration system 541 (like second channel 450 of FIG. 4) is needed in the mixed gas refrigeration system 541 because the mixed gas lines 562 and 563 are directed to the nitrogen loop within the mixed gas refrigeration system 541. The electrical control box 542, nitrogen compressor 509 and inverter 564 may be located outside of the mixed gas refrigeration system 541. Customer equipment 567 may include a pre-cool cryogenic interface module 546, a cold pad cryogenic interface module 565, one or more pre-cool chambers 547 and 548, an electrostatic chuck 549 and a platen 566. Operation may otherwise be similar to that of the embodiment of FIG. 4.

In accordance with an embodiment of the invention, the mixed gas refrigeration system may, for example, be an auto-refrigerating cascade system and may include multiple heat exchangers 491 and one or more phase separators 492 (see FIG. 4) in a mixed gas refrigeration process. Further, the mixed gas refrigeration system may include a branched supply line, delivering mixed refrigerant supply to each of the mixed refrigerant supply lines 444 and 462 (see FIG. 4), and a branched return line, receiving returning mixed refrigerant from each of the mixed refrigerant return lines 445 and 463 (see FIG. 4). Further, in the embodiments of FIGS. 4 and 5, other types of refrigeration systems may be used in place of a mixed gas refrigeration system. For example, a reverse Brayton cycle or other refrigeration system may be used; and may include branched supply and return lines to function in a similar fashion to the supply lines 444, 462 and return lines 445, 463 of FIG. 4. Further, the two channels 443 and 450 of the mixed gas refrigeration system 441 may instead be implemented by two separate mixed gas refrigeration systems, or two separate other types of refrigeration systems.

In accordance with an embodiment of the invention, where heat exchangers are discussed herein, different numbers of such heat exchangers may be used depending on the system efficiency required.

A cooling system in accordance with an embodiment of the invention may be operated in various modes. For example, the modes of operation may include steady state operation; standby (or bypass) operation; startup (initial cool down from room temperature); and shutdown (the time to warm from operating temperature to room temperature for maintenance or other reasons). Such modes of operation may be controlled by system control units 139 or 439, for example.

In accordance with an embodiment of the invention, a system may be used to cool a load 493 (see FIG. 4) inside an insulated enclosure (such as insulated enclosure 410) rather than transferring refrigerant outside the insulated enclosure using transfer lines. For example, such an embodiment may be useful where biological samples are being cooled or frozen, although it may be used with other loads as well. In addition, an embodiment according to the invention may comprise moving a substrate or other object or fluid to be cooled from a pre-cool chamber or other heat transfer surface of to the load to another portion of the load, such as a process chamber.

As used herein, the term "cryogenic" refers to the temperature range between 233 K and 23 K (−40 C and −250 C).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A system for providing a cooling refrigerant to a load, the system comprising:
   a closed loop primary refrigeration system comprising
   a compressor taking in the refrigerant at a low pressure and discharging the refrigerant at a high pressure;
   an expansion valve receiving the refrigerant at the high pressure from the compressor and discharging the refrigerant at the low pressure to an insulated enclosure,
   the insulated enclosure comprising an inlet receiving the refrigerant from the expansion valve and an outlet returning the refrigerant at the low pressure to the compressor;
   at least one heat exchanger within the insulated enclosure receiving the refrigerant at the low pressure and cooling the refrigerant using a secondary refrigeration system in heat exchange relationship with the refrigerant;
   a supply line delivering the refrigerant at the low pressure to the load and a return line returning the refrigerant from the load to the primary refrigeration system;
   the secondary refrigeration system, wherein the secondary refrigeration system comprises at least one secondary cryogenic refrigerator;
   a first channel of the secondary refrigeration system delivering cooling from the secondary refrigeration system to at least one heat transfer surface of the load, and a second channel of the secondary refrigeration system delivering the secondary refrigerant to the at least one heat exchanger; and
   a system control unit controlling operation of at least one of the primary refrigeration system and the secondary refrigeration system to provide a variable refrigeration capacity to the load based on at least one of: a pressure of the primary refrigerant delivered to the load, and at least one temperature of the load.

2. The system of claim 1, the system control unit controlling operation of the secondary refrigeration system to avoid either undercooling of the load or overcooling of the load, based on (i) a measured pressure or a measured temperature of the primary refrigerant returned from the load that is cooled by the primary refrigerant or (ii) a measured pressure or a measured temperature of the primary refrigerant entering the load that is cooled by the primary refrigerant.

3. The system of claim 1, the system control unit controlling at least one of a high pressure, a low pressure and a pressure differential of the primary compressor.

4. The system of claim 1, the system control unit controlling a heat source to supply heat to be delivered to the primary refrigerant or controlling a heat source to supply heat to be delivered to the secondary refrigerant.

5. The system of claim 1, the system control unit controlling flow of the primary refrigerant to bypass at least a portion of the at least one heat exchanger or at least a portion of the primary refrigeration system.

6. The system of claim 1, the system control unit controlling a rate of flow of the primary refrigerant or controlling a rate of flow of the secondary refrigerant.

7. The system of claim 1, the system control unit controlling a set point temperature of the secondary refrigeration system or controlling a speed of a secondary compressor of the secondary refrigeration system.

8. The system of claim 1, the system control unit controlling flow of the secondary refrigerant to bypass at least a portion of the secondary refrigeration system.

9. The system of claim 1, the system control unit controlling flow of at least a portion of the primary refrigerant to warm at least a portion of the load or controlling flow of at least a portion of the secondary refrigerant to warm at least a portion of the load.

10. The system of claim 1, further comprising a transfer line extending out of the insulated enclosure, wherein the supply line delivers the refrigerant at the low pressure to the load through the transfer line, and the return line returns the refrigerant from the load through the transfer line.

11. The system of claim 1, wherein the load is within the insulated enclosure.

12. The system of claim 1, wherein the load comprises at least one of: a semiconductor substrate, a fluid stream for cryogenic separation, a gas to be liquefied, a biological sample, a chemical process, material property analysis equipment, a water vapor trap, an article in a manufacturing process, an imaging device, a subatomic particle detector, a photonic detector, chemical analysis equipment, a superconducting cable, and a superconducting device.

13. The system of claim 1, wherein the secondary refrigeration system comprises a mixed gas refrigeration system.

14. A system for providing a cooling refrigerant to at least one load, the system comprising:
a closed loop primary refrigeration system comprising:
a compressor taking in the refrigerant at a low pressure and discharging the refrigerant at a high pressure;
an expansion valve receiving the refrigerant at the high pressure from the compressor and discharging the refrigerant at the low pressure to an insulated enclosure,
the insulated enclosure comprising an inlet receiving the refrigerant from the expansion valve and an outlet returning the refrigerant at the low pressure to the compressor;
at least one heat exchanger within the insulated enclosure receiving the refrigerant at the low pressure and cooling the refrigerant using a secondary refrigeration system in heat exchange relationship with the refrigerant;
a supply line delivering the refrigerant at the low pressure towards the at least one load and a return line returning the refrigerant from the at least one load to the primary refrigeration system;
a transfer line out of the insulated enclosure delivering the refrigerant received from the supply line at the low pressure to at least one of the at least one load, the transfer line returning the refrigerant from the at least one of the at least one load to the insulated enclosure;
the secondary refrigeration system, wherein the secondary refrigeration system comprises at least one secondary cryogenic refrigerator; and
a system control unit controlling operation of at least one of the primary refrigeration system and the secondary refrigeration system to provide a variable refrigeration capacity to the at least one load based on at least one of: a pressure of the primary refrigerant delivered to the at least one load, and at least one temperature of the at least one load.

15. The system of claim 14 wherein at least one of the at least one load is positioned within the insulated enclosure.

16. The system of claim 14, wherein each of the at least one load comprises at least one of: a semiconductor substrate, a fluid stream for cryogenic separation, a gas to be liquefied, a biological sample, a chemical process, material property analysis equipment, a water vapor trap, an article in a manufacturing process, an imaging device, a subatomic particle detector, a photonic detector, chemical analysis equipment, a superconducting cable, and a superconducting device.

17. The system of claim 14, wherein the secondary refrigeration system comprises a mixed gas refrigeration system.

18. The system of claim 14, the system control unit controlling operation of the secondary refrigeration system to avoid either undercooling of the at least one load or overcooling of the at least one load, based on (i) a measured pressure or a measured temperature of the primary refrigerant returned from the at least one load that is cooled by the primary refrigerant or (ii) a measured pressure or a measured temperature of the primary refrigerant entering one of the at least one load that is cooled by the primary refrigerant.

* * * * *